United States Patent Office 3,759,779
Patented Sept. 18, 1973

3,759,779
LAMINATES
William V. Dumas, Scotia, N.Y., assignor to
General Electric Company
No Drawing. Filed Sept. 21, 1971, Ser. No. 182,550
Int. Cl. C09j 5/02
U.S. Cl. 156—331      6 Claims

ABSTRACT OF THE DISCLOSURE

Laminates having good physical characteristics at room and elevated temperatures are prepared by forming a suspension of the reaction product of unsaturated bisimide and polyamine in a suitable liquid, impregnating the laminae base with the suspension and curing the lay-up to form a laminate under heat and pressure.

This invention relates to resin-impregnated laminates which are readily and conveniently prepared. More particularly, it relates to such laminates which are possessed of good physical characteristics at room temperature and elevated temperatures.

The preparation of laminates prepared by pressing under heat laid-up, resin-impregnated laminae is well known. As requirements for the use of laminates at higher and higher temperatures developed, there were developed high temperature resistant resins such as polyimides with which the base material could be readily impregnated and processed to provide laminates having the requisite high temperature, as well as room temperature properties. Typical of such resinous materials are the polyimides described in U.S. Pat. 3,562,223 which are essentially reaction products of unsaturated bisimides with polyamines.

However, in using such resins, it is usual in preparing the impregnating solution to use solvents such as dioxane, dimethylformamide, N-methylpyrrolidone, cresol, dimethylacetamide, and the like. While such solvents are very adequate in dissolving the resins and lend themselves to the relatively low temperature preparation of laminates for which such resins are known, the solvents as a class are inflammable, difficult to remove, are polluting, and on the whole rather expensive. Additionally, with many of these solvents, there is formed a complex between the solvent and the polyimide material which must be broken by undesirably high heat to obtain relatively low solvent concentration in the impregnated laminae or prepreg.

It is accordingly a primary object of the present invention to provide laminates prepared from such polyimide materials which employ relatively inexpensive, relatively noninflammable or wholly noninflammable, and less toxic materials as the carrier for the polyimide.

Briefly, according to the present invention, the base laminae are coated and impregnated with a suspension of the powdered polyimide in water, alcohol, hydrocarbons or mixtures of such materials, the laminae then being laid up as desired and fabricated under heat and pressure.

Those features of the invention which are believed to be novel are set forth with particularity in the claims appended hereto. The invention will, however, be better understood and further objects and advantages appreciated from a consideration of the following description.

Any of the usual laminating base materials can be used in conjunction with the present invention depending upon the proposed end use for the finished laminate. Any of a number of such materials will occur to those skilled in the art including but not limited to siliceous materials such as glass, quartz or silica, carbon, graphite, boron, asbestos, or high temperature resinous materials which can be in fibrous or mat form as indicated. Also useful are micaceous materials or platy inorganic materials.

The resinous materials which are useful in connection with the present invention include those described in U.S. Pat. 3,562,223, Feb. 9, 1971, such patent being incorporated herein. Generally, the polymeric materials which are useful are derived from the reaction of unsaturated bisimides and polyamines. The bisimide can be expressed by the formula (I)
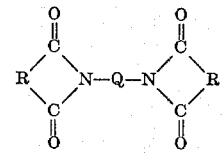

where R is a member selected from the class consisting of the (II)
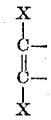

(III)
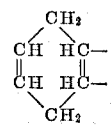

and (IV)
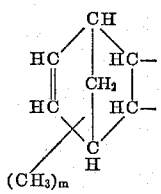

groupings, and halogenated, e.g., chlorinated derivatives of Formulas III and IV containing up to 6 or more halogens, Q is a member selected from the class consisting of divalent organic radicals of at least 2 carbon atoms (both halogenated and unhalogenated) including but not limited to, e.g., divalent hydrocarbon radicals of up to 40 carbon atoms, and divalent groups consisting of two aryl residues attached to each other through the medium of a member selected from the class consisting of an alkylene radical of from 1 to 10 carbon atoms,

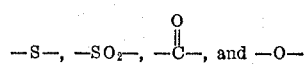

etc., X is a member of the class consisting of hydrogen, halogen, and the methyl radical, and $m$ is 0 or 1, and the methyl group in Formula IV can be present in place of any one hydrogen of the mono-hydrogen-substituted carbons.

The polyamine can be expressed by the formula (V)      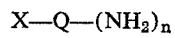

where Q is described above, it being understood, of course, that the Q in the imide and the polyamine can be different. The bisimides of Formula I can vary widely depending upon the types of organic radicals present therein. Among the divalent groupings which Q may broadly and more specifically represent are, for instance, divalent saturated alkylene radicals of up to 40 carbon atoms, for instance, 1 to 10 (e.g., ethylene, propylene, butylene, isopropylidene, hexylene, cyclohexylene, etc.), the divalent radical of diethylene oxide of the formula $$-CH_2-CH_2-O-CH_2-CH_2-,$$

etc.; arylene (e.g., m-phenylene, p-phenylene, p,p'-biphenylene, dichlorophenylene, biphenylene methylene of the formula

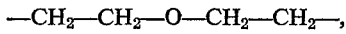

biphenylene oxide, biphenylene sulfone, biphenylene sulfide, keto biphenylene of the formula

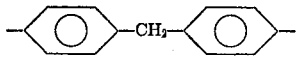

etc.). Obviously, the arylene radicals may be attached to nitrogen through the ortho, meta or para positions.

Typical examples of the bisimides which can be employed with the polyamine of Formula V are, for instance, N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenyldimethylsilyl-bis-maleimide,
N,N'-p,p'-diphenylmethane-bis-maleimide,
N,N'-p,p'-diphenylether-bis-maleimide,
N,N'-p,p'-diphenylthioether-bis-maleimide,
N,N'-diphenylsulfone-bis-maleimide,
N,N'-dicyclohexylmethane-bis-maleimide,
N,N'-m-xylylene-bis-maleimide,
N,N'-p,p'-benzophenone-bis-maleimide,
N,N'-(3,3'-dichloro-p,p'-biphenylene)bis-maleimide,
N,N'-p,p'-diphenylether-bis-endomethylene-tetrahydrophthalimide,
N,N'-p,p'-diphenylmethane-bis-tetrahydrophthalimide, etc.

Halogenated derivatives of such bisimides where halogen is on the anhydride portion of the imide and on an aryl nucleus can also be employed without departing from the scope of the invention, e.g., N,N'-(3,3'-dichloro-4,4'-biphenyloxy)-bis-maleimide,
N,N'-(3,3-dibromo-4,4'-diphenylmethane)bis-dichloro-maleimide,
N,N'-4,4'-diphenylmethane-bis-hexachloroendomethylenetetrahydrophthalimide, etc.

Among the specific polyamines which are useful in connection with the present invention, alone or in admixture, are those listed below:

p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
meta-phenylene diamine
para-phenylene diamine 4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline of formula

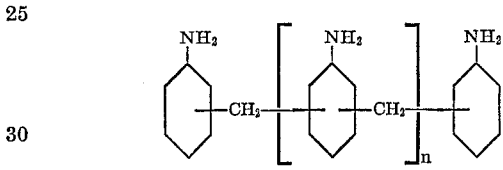

where $n$ is from about 0.1 to 10 and preferably about 0.3.

Among the suspending media or carriers useful in the present connection are water, hydrocarbons and alcohols. Where the ultimate in nonflammability is desired, water is used. Among the hydrocarbons useful in connection with the present invention are such materials as xylene, toluene, and the commercially available hydrocarbon solvents. Also useful are the alcohols including but not limited to methanol, ethanol, butanol, cyclohexanol, and the like. As pointed out above, any of these solvents can be used alone or in any desired combination depending upon the particular situation.

The following examples illustrate the practice of the present invention, it being realized that they are not to be taken as limiting in any way. The polyimide used was prepared by mixing as in Example 6 in the above cited U.S. Pat. 3,562,223, 45.15 parts of maleic N,N'-4,4'-diphenylphenylmethanebisimide and 9.9. parts of bis-(4-aminophenyl) methane, the mixture being heated at 200° C. for five minutes and the reaction product allowed to cool and ground to powdered form.

EXAMPLE 1

A 35 percent by weight solids suspension was made up by slurrying the above resin powder and distilled water. Glass cloth was then dipped in the suspension, wiped to remove the excess, and dried for 6 minutes at 120° C., the water evaporating and the resinous powder melting and flowing intimately into the cloth. The prepreg so prepared was cut into twelve 3¾" x 6" sheets, stacked and nested. The prepreg was then placed into a press with contact pressure, the press having previously been preheated to 120° C. Contact pressure was maintained for about 5 minutes while the prepreg temperature rose to 120° C. Then a pressure of 300 p.s.i. was applied to the material and after 10 minutes at 120° C. and 300 p.s.i., the temperature was raised to 180° C., the pressure and temperature then being held constant for one hour or more. The laminate was cooled in the press under pressure, removed and post-baked for 18 hours at 250° C. The post-baked sample was cut into 1" x 3" segments and tested for flexural strength with good results as indicated in the table below.

EXAMPLE 2

A 40 percent by weight suspension of the above polyimide was prepared using butanol, this suspension being used to impregnate glass cloth as in Example 1, the prepreg so prepared being dried at 100° C. to 150° C. for about three to five minutes to evaporate the alcohol and melt the resin powder. The prepreg so prepared was cut into 6" x 8" sheets, twelve of such sheets being stacked and nested and placed in a hydraulic press preheated to 170° C., contact pressure being maintained until the prepreg temperature rose to this value. A pressure of 750 p.s.i. was applied for 30 minutes, the laminate being then removed hot from the press and cooled at ambient temperature and post-baked for 20 hours at 250° C. Test samples were then prepared and tested for flexural strength as indicated in the table below.

EXAMPLE 3

Example 2 was repeated, the impregnated glass cloth being cut into 4" x 6" pieces, twelve plies being placed in a press preheated to 100° C. The prepreg was allowed to come up to press temperature, a pressure of 100 p.s.i. then being applied for 15 minutes. The temperature was then raised to 180° C. at which point a pressure of 200 p.s.i. was applied for one hour, the laminate being allowed to cool in the press. Test samples of this laminate were evaluated with the results shown in the table below.

EXAMPLE 4

Example 3 was repeated except that after bringing the prepreg temperature to 100° C. in the press, a pressure of 500 p.s.i. was applied and the temperature raised to 180° C., these conditions being maintained for one hour. The laminate was then cooled in the press and removed, samples being tested with the results shown below.

EXAMPLE 5

Example 3 was repeated except that 4¼" x 6¼" prepreg sheets were used, the press being reheated to 180° C. and a pressure of 500 p.s.i. being applied after the inserted lay-up had come up to temperature. This condition of 180° C. and 500 p.s.i. was maintained for 45 minutes after which the laminate was cooled in the press and removed. Samples of different laminates were tested with the results shown in the table. While in the above examples certain specific sequential steps of heat and pressure are prescribed, it will be realized that these may be varied in any manner usual in the art, the only dictate being that the final product have the desired final physical characteristics.

TABLE

| Example | Tmperature (° F.) | Flexural strength (p.s.i.) | Flexural modulus (p.s.i.) |
|---|---|---|---|
| 1 | Room | (A) 72,780 | 3.49×10⁶ |
| | Room | (B) 68,460 | 3.44×10⁶ |
| | 400 | (A) 73,088 | 3.17×10⁶ |
| | 400 | (B) 68,450 | 3.31×10⁶ |
| 2 | Room | (C) 91,853 | 4.27×10⁶ |
| | 400 | (C) 92,238 | 4.23×10⁶ |
| 3 | Room | (D) 89,507 | 4.45×10⁶ |
| | Room | (E) 85,791 | 4.34×10⁶ |
| | 400 | (D) 87,214 | 4.07×10⁶ |
| 4 | Room | (F) 93,742 | 4.93×10⁶ |
| | Room | (G) 93,311 | 5.00×10⁶ |
| | 400 | (F) 92,273 | 4.72×10⁶ |
| 5 | Room | (H) 79,228 | 4.17×10⁶ |
| | Room | (I) 86,062 | 4.75×10⁶ |
| | 400 | (H) 79,162 | 3.83×10⁶ |
| | 400 | (I) 78,999 | 3.70×10⁶ |

From the results shown in the above table, it will be quite evident that there are prepared readily and safely by the present invention laminates which are possessed of desirably elevated temperature as well as room temperature characteristics. The laminates so prepared are useful in providing structural parts which are subject to high temperatures as in aircraft engine cowlings, sheaths and the like. They are also useful in circuit board preparation. Other uses will occur to those skilled in the art.

What I claim as new and desire to secure by Letters Patent of the United States is:

1. The process of preparing a laminate which comprises impregnating a base structure with a resin which is the reaction product of unsaturated bisimide of the formula (I)

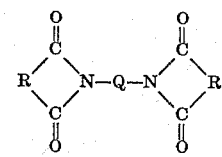

where R is a member selected from the class consisting of the (II)

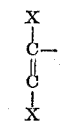

(III)

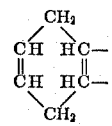

and (IV)

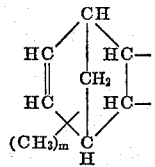

groupings, and halogenated derivatives of Formulas III and IV containing up to 6 or more halogens, Q is a member selected from the class consisting of divalent organic radicals of at least 2 carbon atoms (both halogenated and unhalogenated) including divalent hydrocarbon radicals of up to 40 carbon atoms, and divalent groups consisting of two aryl residues attached to each other through the medium of a member selected from the class consisting of an alkylene radical of from 1 to 10 carbon atoms,

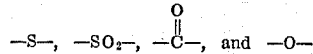

X is a member of the class consisting of hydrogen, halogen, and the methyl radical, and $m$ is 0 or 1, and the methyl group in Formula IV can be present in place of any one hydrogen of the mono-hydrogen-substituted carbons, the polyamine can be expressed by the formula (V)     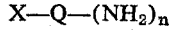

where Q is as described above, and where X is as described above wherein Q in the imide and Q in the polyamine can be different, said resin being in the form of a powder suspended in a carrier selected from water, alcohol, hydrocarbon and mixtures thereof, drying said impregnated base structure, laying up said structure as desired, and curing under heat and pressure.

2. A process as in claim 1 where said carrier is water.
3. A process as in claim 1 where said carrier is alcohol.
4. A process as in claim 1 wherein said carrier is butanol.
5. A process as in claim 1 where said carrier is hydrocarbon.
6. The product prepared by the process of claim 1.

References Cited
UNITED STATES PATENTS

| | | | |
|---|---|---|---|
| 3,562,223 | 2/1971 | Bargain et al. | 260—78 UA |
| 3,565,549 | 2/1971 | Lubowitz et al. | 117—126 |
| 3,697,345 | 10/1972 | Vaughan et al. | 156—331 X |

EDWARD G. WHITBY, Primary Examiner

U.S. Cl. X.R.

17—126 GR; 260—78 UA